United States Patent
Whatmough

(10) Patent No.: US 7,230,622 B2
(45) Date of Patent: Jun. 12, 2007

(54) METHOD AND COMPUTING DEVICE FOR RENDERING GRAPHICAL OBJECTS

(76) Inventor: Kenneth John Whatmough, 25 Forsyth Cres., Georgetown (CA) L7G 6G3

( * ) Notice: Subject to any disclaimer, the term of this patent is extended or adjusted under 35 U.S.C. 154(b) by 380 days.

(21) Appl. No.: 10/990,441

(22) Filed: Nov. 18, 2004

(65) Prior Publication Data

US 2006/0103649 A1    May 18, 2006

(51) Int. Cl.
*G06T 15/10* (2006.01)
(52) U.S. Cl. .................................................. 345/427
(58) Field of Classification Search ............... None
See application file for complete search history.

(56) References Cited

U.S. PATENT DOCUMENTS 6,187,494 B1    2/2001  Kawamura et al.
6,577,310 B1 *  6/2003  Kim et al. ................... 345/427
2001/0028351 A1  10/2001 Arai et al.

FOREIGN PATENT DOCUMENTS

EP    1 018 707    7/2000

OTHER PUBLICATIONS

"Geometrical Transformations" in "Computer Graphics: Principles and Practice" Addison-Wesley Publishing Company, Second Edition, by Foley et al. pp. 201-222.*

* cited by examiner

*Primary Examiner*—Mark Zimmerman
*Assistant Examiner*—Enrique L. Santiago

(57) ABSTRACT

A method and computing device for rendering graphical objects is provided. A transformation to be applied to a graphical object is determined. Verification data corresponding to the transformation is determined. The transformation is adjusted using the verification data. The graphical object transformed with the transformation is rendered via an output interface.

34 Claims, 11 Drawing Sheets

$$A = \begin{bmatrix} a_{11} & a_{12} & \vdots & a_x \\ a_{21} & a_{22} & \vdots & a_y \\ \hdashline 0 & 0 & \vdots & 1 \end{bmatrix}$$

404 — $a_{11}$, 408 — $a_x$, 400, 412, 416

| Angle (degrees) | Sin |
|---|---|
| 0 | 0.00000 |
| 1 | 0.01745 |
| 2 | 0.03489 |
| 3 | 0.05233 |
| 4 | 0.06975 |
| 5 | 0.08715 |
| 6 | 0.10452 |
| 7 | 0.12186 |
| 8 | 0.13917 |
| 9 | 0.15643 |
| ⋮ | ⋮ |
| 88 | 0.99939 |
| 89 | 0.99984 |
| 90 | 1.00000 |

500

$$= \begin{bmatrix} a_{11} \times c'_{11} + a_{12} \times c'_{21} & a_{11} \times c'_{12} + a_{12} \times c'_{22} & a_{11} \times c'_x + a_{12} \times c'_y + a_x \\ a_{21} \times c'_{11} + a_{22} \times c'_{21} & a_{21} \times c'_{12} + a_{22} \times c'_{22} & a_{21} \times c'_x + a_{22} \times c'_y + a_y \\ \hdashline 0 & 0 & 1 \end{bmatrix}$$

904 → Shape        Rectangle
908 → Anchor point (0,0)
912 → Height:      2
916 → Width:       10

920 → Step 1: Position graphical object at (20,20)
924 → Step 2: Rotate 360 degrees over 2 seconds around (20,20), and repeat until user input received

US 7,230,622 B2

METHOD AND COMPUTING DEVICE FOR RENDERING GRAPHICAL OBJECTS

FIELD OF THE INVENTION

The invention relates generally to graphics systems and, more particularly, to a method and computing device for rendering graphical objects.

BACKGROUND

Handheld electronic devices are increasingly popular as a result of their reduced size and weight. Advances in microelectronics and battery technology have permitted the functionality of such devices to approach that of personal computers. As the functionality of handheld electronic devices grows, so do the demands of the graphical user interfaces of applications executing thereon in order to provide users access to this functionality. In addition, such applications use multimedia components to provide, among other things, a more intuitive graphical user interface with which the user interacts to access the functionality.

These multimedia components typically include the animation of two and three-dimensional graphical objects. The animation of such two and three-dimensional graphical objects is known in the art. The objects are rendered repeatedly via an output interface, such as a display, over a period of time. Generally, the objects undergo transformations between successive renderings.

A number of graphical languages exist that permit the specification of a graphical object for display and any transformations to be applied to the graphical object. The graphical objects are typically characterized by relative or initial absolute coordinates or vectors. These coordinates or vectors often correspond to the vertices of the graphical object.

Transformations can include, but are not limited to, movement (including change of position and rotation), scaling and skew of the graphical object in the plane. Other transformations include, but are not limited to, color and transparency transformations. Where a three-dimensional graphical object is being rendered, the vertices of the graphical object are projected onto the two-dimensional plane of the display.

In some cases, a rendered graphical object is distorted or otherwise inaccurately represented due to errors introduced during the calculation of the transformation applied to the graphical object. These errors can result from the determination of trigonometric values. Trigonometric values are used for translations that include a rotation and are interpolated using a table of pre-determined trigonometric values. The size of error can vary depending on the number of pre-determined trigonometric values provided in the table.

SUMMARY

According to an aspect of the invention, a method of rendering a graphical object with a computing device having an output interface is provided. An additive transformation to be applied to a graphical object is determined by linearly interpolating between a set of trigonometric values. The additive transformation is applied to a previously-determined cumulative transformation to obtain a cumulative transformation. Verification data is determined for the transformation, and the transformation is adjusted using the verification data. The graphical object transformed with the transformation is then rendered via the output interface.

By determining verification data and using it to adjust transformations to be applied to a graphical object, errors present in the transformations as a result of estimated values can be verified and corrected.

BRIEF DESCRIPTION OF THE DRAWINGS

Preferred embodiments of the invention will now be described, by way of example only, with reference to the attached Figures, wherein:

FIGS. 15a to 16d show the indicium matrices for the indicia of the graphical object of FIG. 12;

FIG. 16 shows the graphical object of FIG. 12 rendered after an initial transformation.

DETAILED DESCRIPTION

Many computing devices for rendering graphical objects use a cumulative transformation to track state information for a graphical object. The cumulative transformation represents all of the relative or additive transformations that the graphical object has been subject to during the total period of time from commencement of the animation to the end of the period of time represented by the cumulative transformation. The cumulative transformation is a composite of a set of additive transformations. Each additive transformation represents all transformations that have occurred during a segment of the total period of time relative to the state of the graphical object at the beginning of the time segment. The additive transformations for contiguous time segments since the start of the animation of the graphical object are "added" together in the correct sequential order to provide the cumulative transformation.

Such computing devices determine a cumulative transformation and apply it to a graphical object in order to render the graphical object. The cumulative transformation is determined each time the graphical object is rendered by determining the additive transformation for the time segment since the graphical object was last rendered, and applying this additive transformation to the cumulative transformation determined at the time the graphical object was last rendered (i.e., the start of the time segment). The first time the cumulative transformation is determined, it is set equal to the determined additive transformation.

Figure 1:
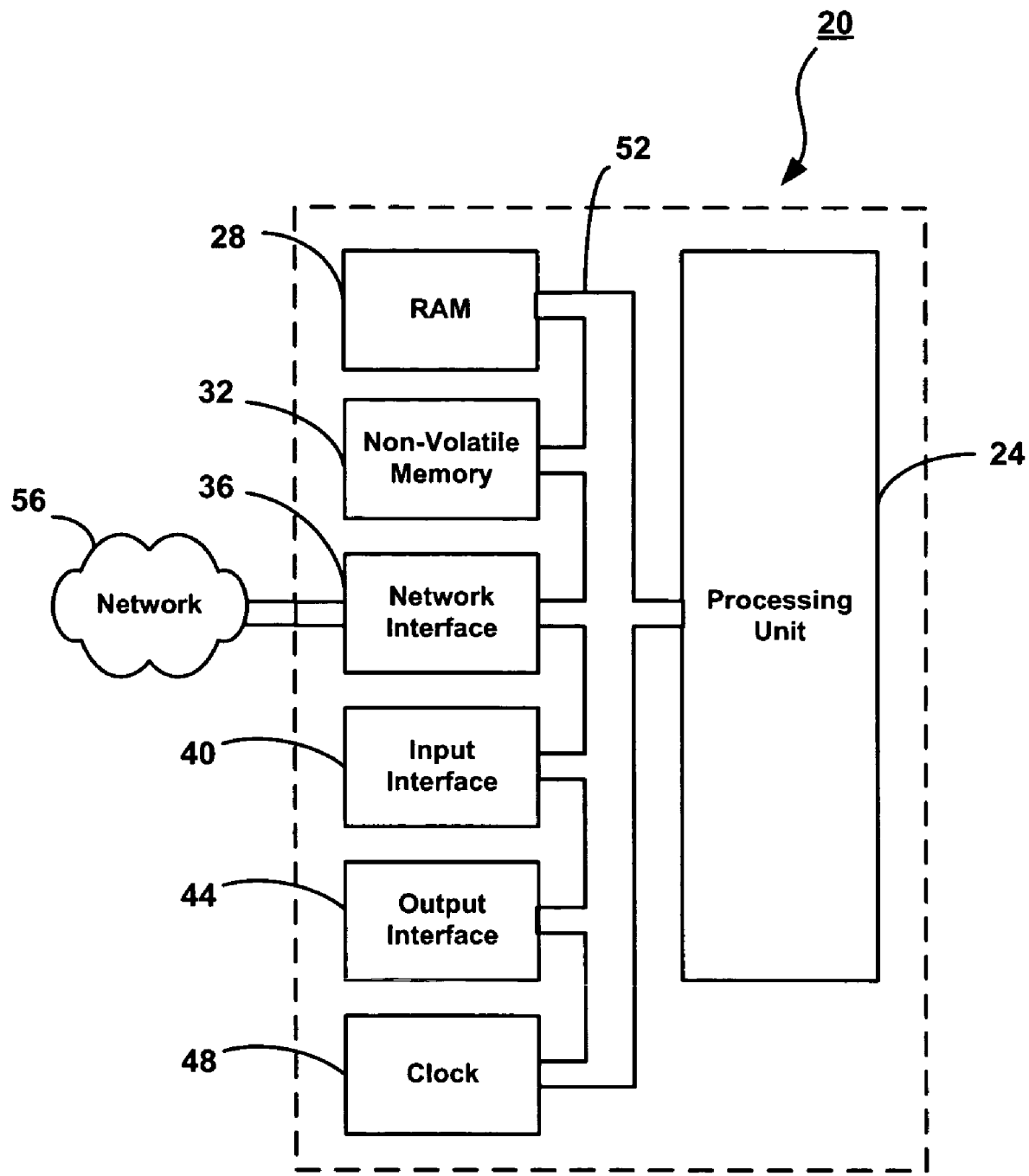
FIG. 1 is a block diagram of a computing device for rendering graphical objects.

Turning now to FIG. 1, a computing device for rendering graphical objects in accordance with this method is shown and is generally identified by reference numeral 20. The computing device 20 comprises a processing unit 24 in communication with volatile random access memory (RAM) 28, non-volatile memory 32, a network interface 36, an input interface 40, an output interface 44 and a system clock 48 over a local bus 52. The network interface 36 is in communication with a network 56.

In an embodiment, the computing device 20 is a handheld electronic device. In this case, the processing unit 24 is a low power consumption processor, such as an ARM processor, and the RAM 28 and non-volatile memory 32 are limited in size. The network interface 36 is a cellular module and the network 56 is a cellular telephone network. The input interface 40 is a QWERTY thumb keyboard and a thumb wheel. The output interface 44 is a monochrome display that is 240 by 240 pixels in size. The system clock 48 is a battery-powered component that maintains timing information.

The computing device 20 executes an operating system and an application for rendering graphical objects via the output interface 44. The application is operable to receive one or more graphical objects and one or more transformation commands and render the graphical objects via the output interface 44 in accordance with the transformation commands.

Figure 2:
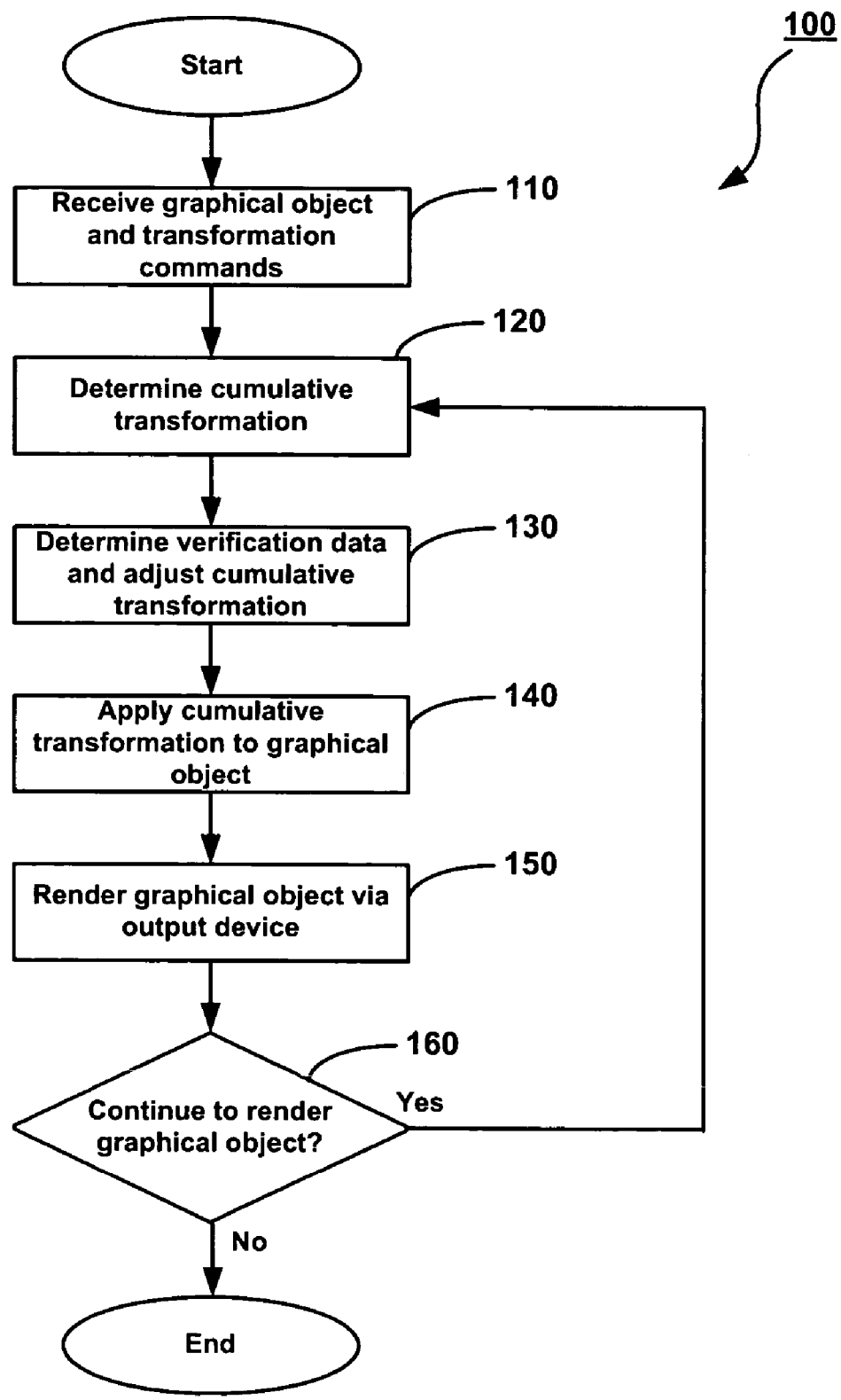
FIG. 2 shows a method of rendering graphical objects in accordance with an embodiment of the invention.

Turning now to FIG. 2, a method of rendering graphical objects using the computing device 20 in accordance with an embodiment of the invention is shown at 100. The method begins at 110, where a graphical object to be rendered and one or more transformation commands for transforming the graphical object are received. Once the graphical object and one or more transformation commands are received, a cumulative transformation is then determined at 120. At 130, verification data is determined for the transformation determined at 120, and the cumulative transformation is adjusted using the verification data. Then, the cumulative transformation is applied to the graphical object at 140 to transform the graphical object in accordance with the transformation commands received earlier. At 150, the transformed graphical object is rendered via the output interface 44. At 160, it is determined whether the graphical object is to be rendered again via the output interface 44. If the graphical object is to be rendered again, the method 100 returns to 120, where a subsequent cumulative transformation is determined. If, instead, the graphical object is not to be rendered again via the output interface 44, the method 100 ends.

At 110, during receipt of the graphical object and the one or more transformation commands, a browser application for viewing mark-up language documents or pages sends a request for a page to a server via the network 56. Upon receipt of a page, the browser application parses the page to determine if the page contains a multimedia script. If the page contains a multimedia script, the browser application launches a plug-in application and passes the script to the plug-in application. In turn, the plug-in application parses the script to determine if there are any graphical objects and transformation commands therein. If there are, the plug-in application extracts the graphical objects and transformation commands and stores them in RAM 28.

Each graphical object takes the form of a two-dimensional geometric shape, such as a polygon or a circle. The script defines an anchor point for the graphical object that is used as a basis for the transformations. In addition, the script contains sufficient information to reconstruct the graphical object in relation to the anchor point.

As an example, in the case of a polygon, the anchor point may be a vertex. All of the other vertices of the polygon may be described by the script in terms of their Cartesian coordinates relative to the anchor point.

The graphical objects are registered and, for each graphical object, a set of indicia are determined and registered. The set of Indicia provide a framework for rendering the graphical object. The indicia can be specified in the script or can be determined by the plug-in application using the knowledge of shape of the graphical object. In the case of polygons, for example, the indicia can be assumed to be the vertices.

Figure 3:
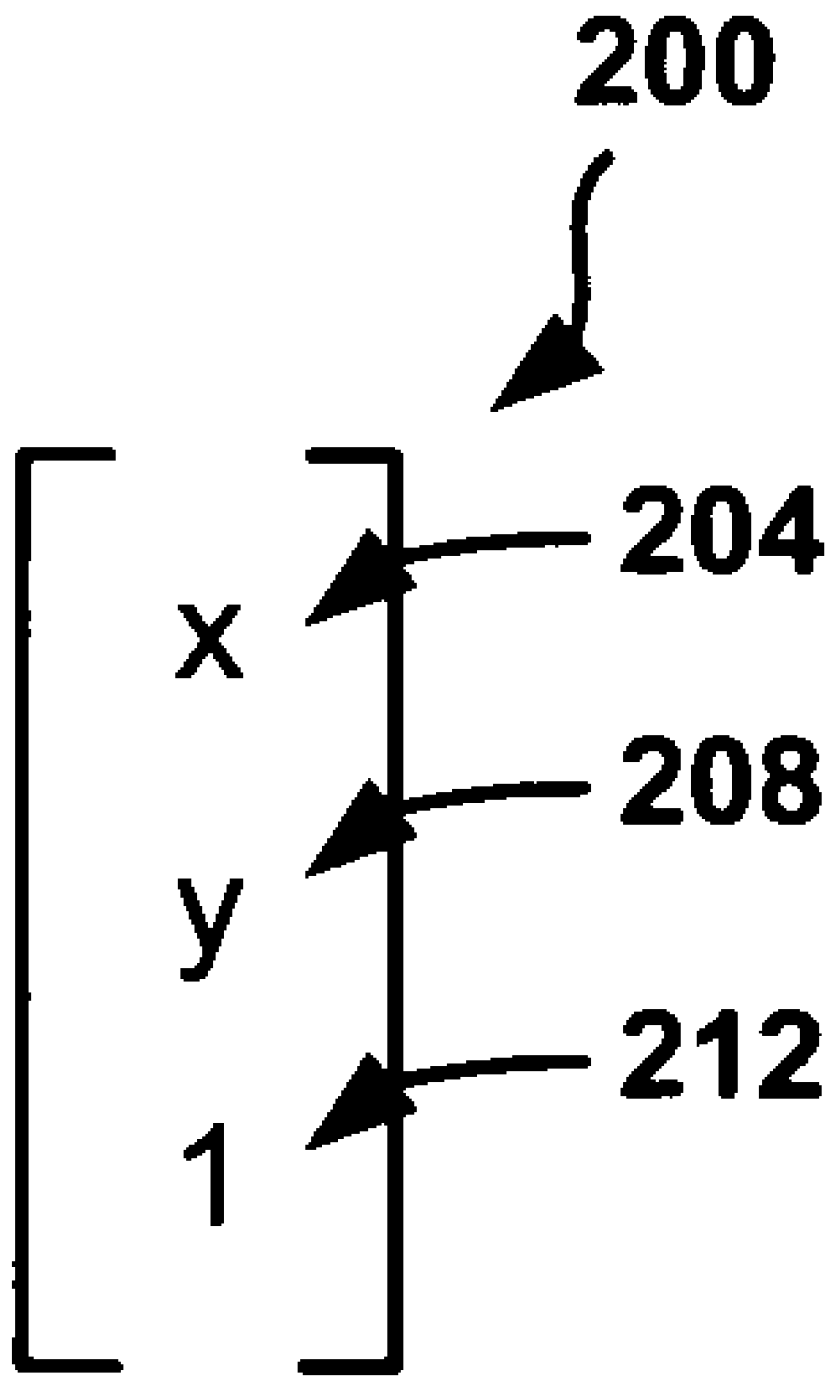
FIG. 3 shows an indicium matrix corresponding to an indicium of a graphical object.

FIG. 3 shows the general form for the indicia are registered in. Each of the indicia is registered as an indicium matrix 200 of their Cartesian coordinates relative to the anchor point. The matrix includes an x coordinate 204, a y coordinate 208 and a homogeneous divisor 212. The homogeneous divisor 212 permits linear transformation of the indicia independent of the location of the graphical object (i.e., the x coordinate 204 and the y coordinate 208). Linear transformations are simple relocations that do not affect the size, shape, orientation, etc.

Figure 4:
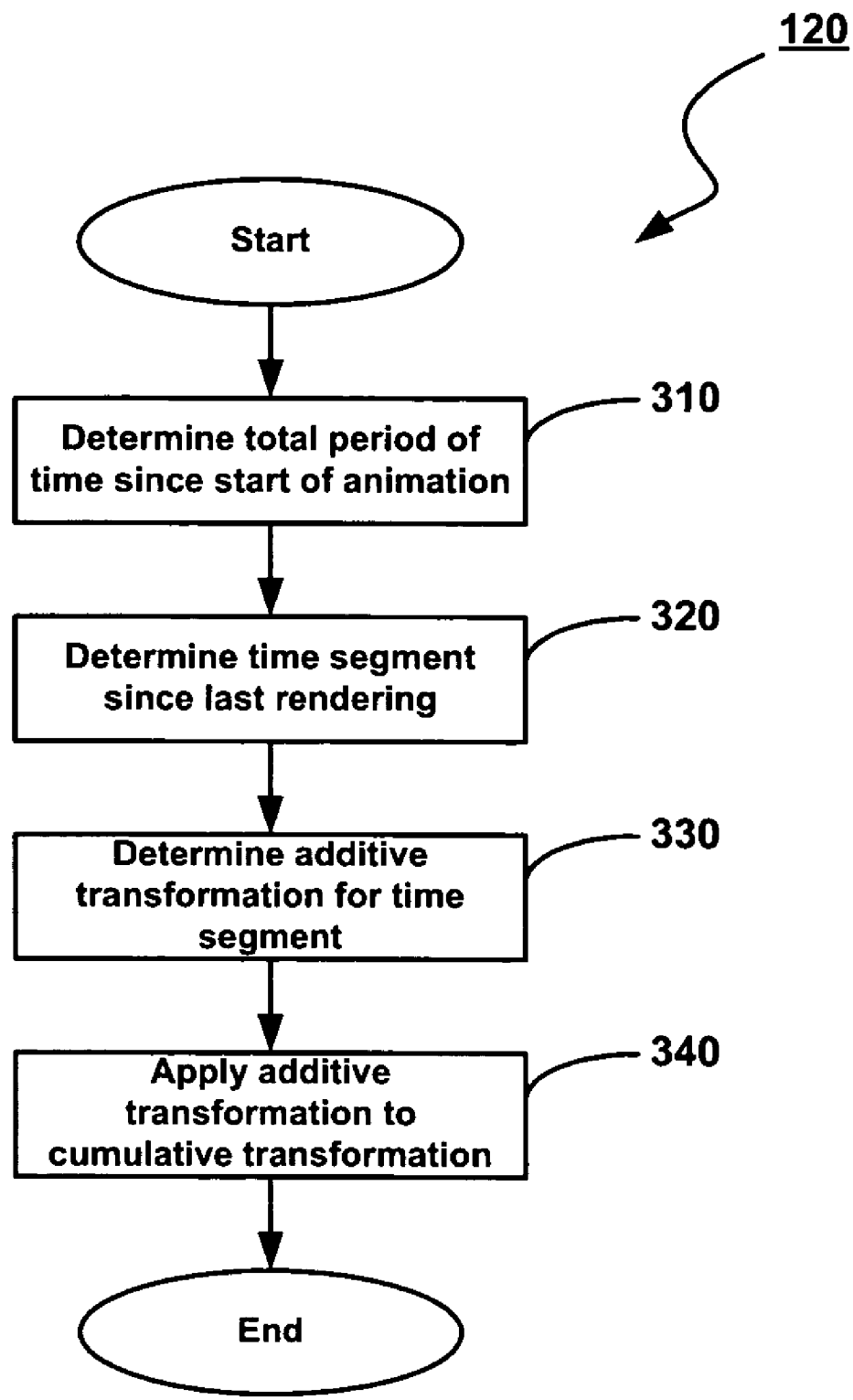
FIG. 4 shows a method of determining a cumulative transformation in accordance with the method of FIG. 2.

FIG. 4 better illustrates the determination of a cumulative transformation at 120. The total period of time since the start of the animation is first determined at 310. This is performed by obtaining the current time from the system clock 48, registering it in RAM 28, and comparing it to the time obtained at the start of the animation. Next, at 320, the time interval since the last rendering is determined. This is simply the difference between the time registered during the last rendering and the current time obtained from the system clock 48. The additive transformation corresponding to the transformation commands which apply for the time segment is then determined at 330. The additive transformation accounts for the relative transformation to which the graphical object is subjected during the time interval determined at 320. That is, the additive transformation reflects the relative transformation that occurs to take the graphical object from its state (i.e., position, rotation, skew, etc.) at the last rendering to its state at the current time. Once the additive transformation has been determined, the additive transformation is applied to the previously-determined cumulative transformation at 340. The resulting cumulative transformation, when applied to a graphical object, transforms the graphical object in accordance with the transformation commands for the total period of time determined at 310 (i.e., from introduction of the graphical object to the present).

Like the data for graphical objects, the additive and cumulative transformations determined at 330 and 340 take the form of matrices.

Figures 5, 6:
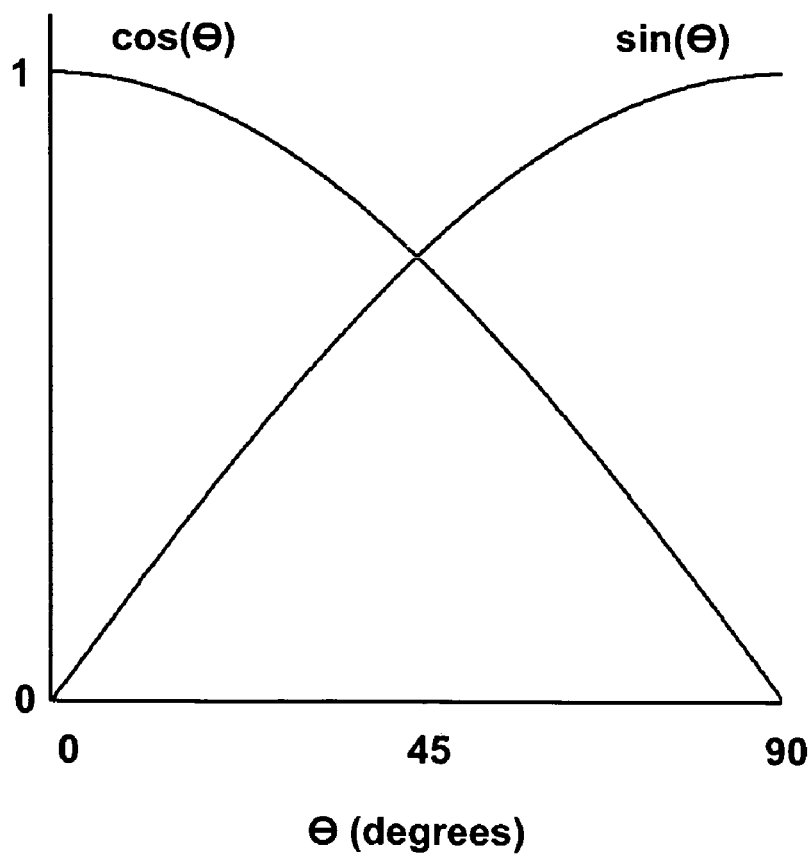
FIG. 5 shows the form of an additive transformation matrix.
FIG. 6 is a chart of the sine and cosine functions between 0 and 90 degrees.

FIG. 5 shows an additive transformation matrix, A, 400 determined during 330. The matrix 400 is shown having four quadrants. A first quadrant 404 includes elements related to non-linear transformations, such as rotations, resizings, shears, etc. A second quadrant 408 includes elements related to linear transformations. A third quadrant 412 includes two dummy elements with a value of zero. A fourth quadrant 416 includes a dummy element with a value of one. Each of the elements is stored in a fixed decimal register having 16 bits for representing the integral portion of the element and 16 bits for representing the fractional portion of the element.

Where the additive transformation includes a rotation, trigonometric values are employed in determining the elements of the first quadrant 404 of the additive transformation matrix 400. The form of an additive transformation matrix for a rotation of θ degrees around the point (0,0) is:

$$A = \begin{bmatrix} \cos(\theta) & -\sin(\theta) & 0 \\ \sin(\theta) & \cos(\theta) & 0 \\ 0 & 0 & 1 \end{bmatrix} \quad \text{(Eq. 1)}$$

If the graphical object is to be rotated around a point other than (0,0), the center of rotation is first transformed to (0,0) using a linear transformation, the rotation is performed and then the center of rotation is transformed back to its original location using a linear transformation. As shown above, values of the sine and cosine function are used to represent a rotation.

Generally, trigonometric values are determined using a look-up table of angles and corresponding trigonometric values. Often, the look-up tables only contain trigonometric values for angles between 0 and 90 degrees as trigonometric values for angles greater than ninety degrees can be determined as a function of a corresponding value within the 0 to 90 degree range. For example, for an angle θ between 90 and 180 degrees, $\cos(\theta) = -\cos(180° - \theta)$.

FIG. 6 illustrates the sine and cosine functions in the range of 0 to 90 degrees. As can be seen, the cosine function is, in fact, a mirror-image of the sine function in this range. As a result, values of the cosine function can be determined from the sine function in the range of 0 to 90 degrees using the following formula:

$$\cos(\theta) = \sin(90° - \theta) \quad \text{(Eq. 2)}$$

As can be seen in FIG. 6, the sine function is concave over the range from 0 to 90 degrees; that is, its first derivative, or slope, is positive while its second derivative, or curvature, is negative. The negativity of the second derivative indicates that the function bends downward. If a trigonometric value is sought for an angle that does not have a corresponding value in the table, an interpolation is performed to determine intermediate trigonometric values.

In cases where processing power and memory are generally less limited than for the computing device 20, first and second order derivatives of the sine function can be maintained in the look-up table. These derivatives can be used to approximate a curve for the sine function between values based on the slope and curvature of the sine function at the values. Interpolated values can then be determined using the approximated curve.

Where processing power and memory are limited, however, the sample frequency for angles for which trigonometric values are stored (i.e., the number of angles for which values are stored) is decreased to reduce the number of values in the table. Further, first and second order derivatives of the sine function are not stored in the limited memory as the processing power required to determine the approximated trajectory of the sine function in a timely manner may not be available.

Figures 7, 8:
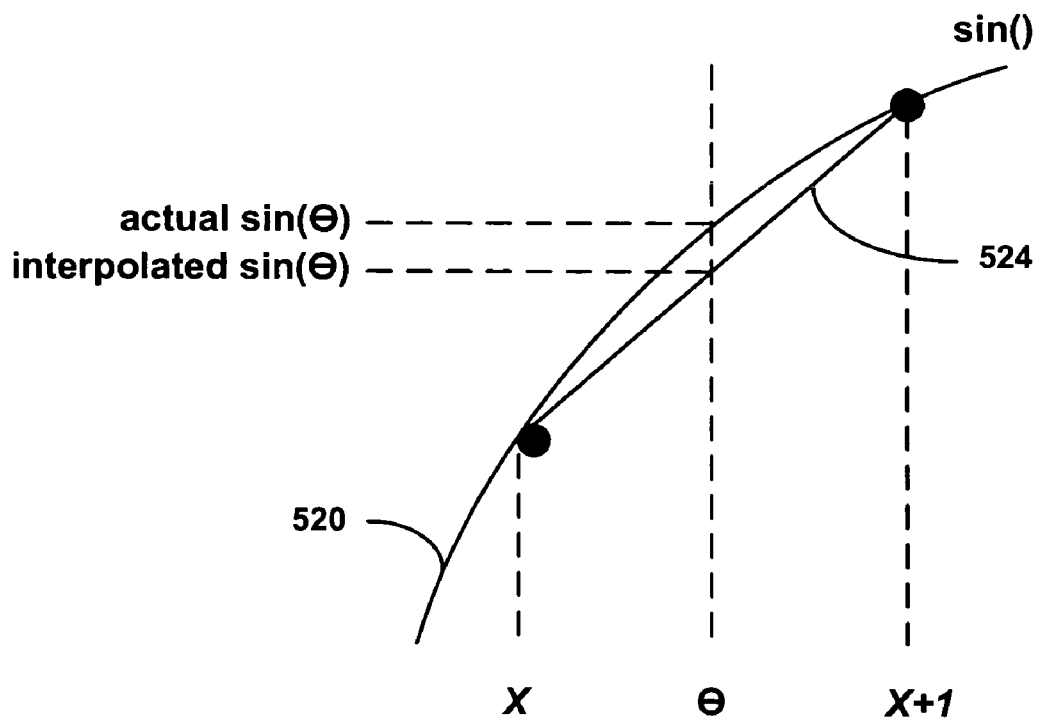
FIG. 7 shows a portion of a table of angles and corresponding trigonometric values.
FIG. 8 illustrates the linear interpolation of trigonometric values using the table of FIG. 7.

FIG. 7 shows a portion of a look-up table 500 of trigonometric values stored by the computing device 20 in non-volatile memory 32. As will be noted, trigonometric values are stored for angles between 0 and 90 degrees with a relatively low sampling frequency of one degree between consecutive angles. Due to the limited processing power and/or memory of computing device 20, linear interpolation is used to determine an intermediate trigonometric value.

FIG. 8 illustrates a linear interpolation to determine the value of the sine function 520 for θ that is intermediate two integral values, x and x+1, for which sine function values are available in the look-up table partially illustrated in FIG. 7. For purposes of illustration, the concave curvature of the sine function has been exaggerated. The formula used to linearly interpolate sine function values is:

$$\sin(\theta) = (x+1-\theta) \times \sin(x) + (\theta - x) \times \sin(x+1)$$

A linear interpolation 524 is shown denoting interpolated values for the sine function between x and x+1. As can be seen, the linearly interpolated sine function value for θ is lower than the actual sine function value for θ. Due to the concavity of the sine function over this range, all linearly interpolated values fall below the actual values.

As a result, many sine function values determined using linear interpolation between values of the look-up table are lower than the actual sine function values. Similarly, as the cosine function values are determined using Equation 2 above, many of the determined cosine function values are lower than the actual cosine function values. In both cases, none of the determined sine and/or cosine function values exceed the actual values. With a reduced sampling frequency of one degree, the discrepancies are enlarged.

Where the additive transformation matrix 400 comprises a rotation, accordingly, the elements of the first quadrant 404 are less than or equal to the actual trigonometric values that represent the rotation.

The determinant of an additive or cumulative transformation matrix is a statistic determined from the elements thereof that can indicate the presence of scaling or distortion. In the case of the additive transformation matrix 400, the determinant is equal to:

$$a_{11} \times a_{22} - a_{12} \times a_{21}$$

As noted, the calculation of the determinant simplifies to a function of the elements of the first quadrant. This is due to the form of the additive and cumulative transformation matrices, wherein the elements of the bottom row are always 0, 0 and 1.

Where a transformation command indicates that the graphical object should increase in size by a factor, the elements of the first quadrant of the additive transformation matrix 400 are increased by that factor. As a result, the determinant increases proportionately to the scaling factor. Conversely, where a transformation command indicates that the graphical object should decrease in size by a factor, the elements of the additive transformation matrix 400 are decreased by that factor. As a result, the determinant decreases proportionately with the scaling factor.

Only the elements of the first quadrant are adjusted. As the variables in the second quadrant relate to linear transformations, and not to scalings (in the strict sense), they are unaffected by the scaling. Further, the dummy elements of the third and fourth quadrants do not vary from their original values.

When the additive transformation matrix 400 represents a rotation, the elements of the first quadrant can be understated in comparison to the true values that represent such a rotation, as noted above. The majority of the time, this understating of the elements of the first quadrant either negatively impacts the determinant of the additive transformation matrix 400, or has no impact thereon. In a few cases, the understating of the elements of the first quadrant positively impacts the determinant of the additive transformation matrix 400. As will be understood by a person skilled in the art, this happens when the elements $a_{11}$ and $a_{22}$ are more understated than the elements $a_{12}$ and $a_{21}$, and generally only manifests itself when performing such calculations using limited fixed decimal registers, such as used by the computing device 20. Iterative determination and application of additive transformation matrices that tend to have understated determinants causes the determinant of the cumulative transformation matrix to tend to shrink over time.

Figure 9:
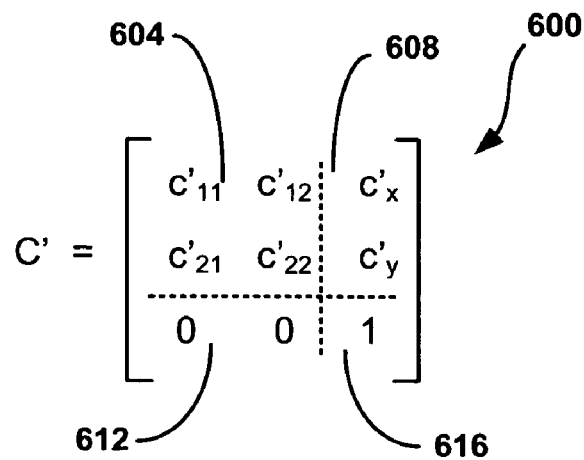
FIG. 9 shows the form of a previously-determined cumulative transformation matrix.

FIG. 9 shows a previously-determined cumulative transformation matrix, C', 600. The previously-determined cumulative transformation matrix 600 has the same form as the additive transformation matrix 400 in that the cumulative transformation matrix 600 has four similar quadrants. A first quadrant 604 includes elements related to non-linear transformations, such as rotations, resizings, shears, etc. A second quadrant 608 includes elements related to linear transformations. Linear transformations are simple relocation transformations that do not affect the size, shape, orientation, etc. A third quadrant 612 includes two dummy elements with a value of zero. A fourth quadrant 616 includes a dummy element with a value of one.

The application of the additive transformation matrix 400 to the previously determined cumulative transformation matrix 600 at 340 can be represented as follows:

$$C = A \times C' \qquad (3)$$

wherein C represents the resulting cumulative transformation matrix, A represents the additive transformation matrix 400 and C' represents the previously-determined cumulative transformation matrix 600.

Figure 10:
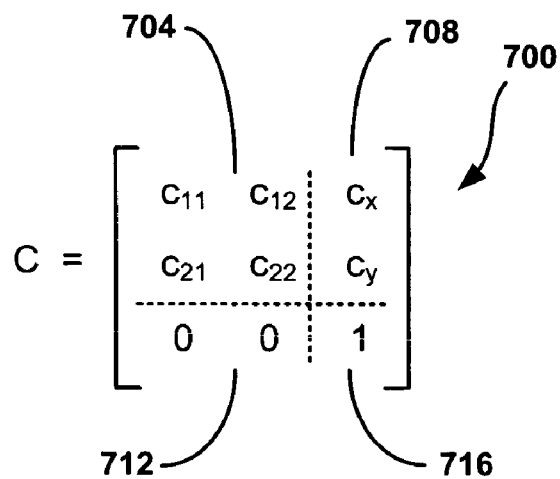
FIG. 10 shows the form of a cumulative transformation matrix and its determination.

FIG. 10 shows the resulting cumulative transformation matrix, C, 700 determined using Equation 3, the additive transformation matrix 400 and the cumulative transformation matrix 600. As both the additive transformation matrix, A, 400 and the previously-determined cumulative transformation matrix, C', 600 are 3 by 3 matrices, the resulting cumulative transformation matrix, C, 700 is also a 3 by 3 matrix. As can be seen, the cumulative transformation matrix 700 also assumes a form similar to that of the additive transformation matrix 400 and the cumulative transformation matrix 600, having elements that can be grouped into four quadrants: a first quadrant 704, a second quadrant 708, a third quadrant 712 and a fourth quadrant 716.

An ideal transformation matrix for a rotation has a determinant of one, indicative of the fact that no scaling is occurring. As additive transformation matrices for rotations generally have elements determined from understated trigonometric values in the computing device 20, however, the resulting transformation matrix has the same effect of a reduction scaling (i.e., the scaling factor is below one). With a scaling factor that is below one, application of the additive transformation matrix 400 to the previously-determined cumulative transformation matrix 600 inappropriately decreases the scaling factor of the cumulative transformation matrix 700. If applied to the graphical object without adjustment, the cumulative transformation matrix 700 would reduce the scale of the graphical object inappropriately.

Figure 11:
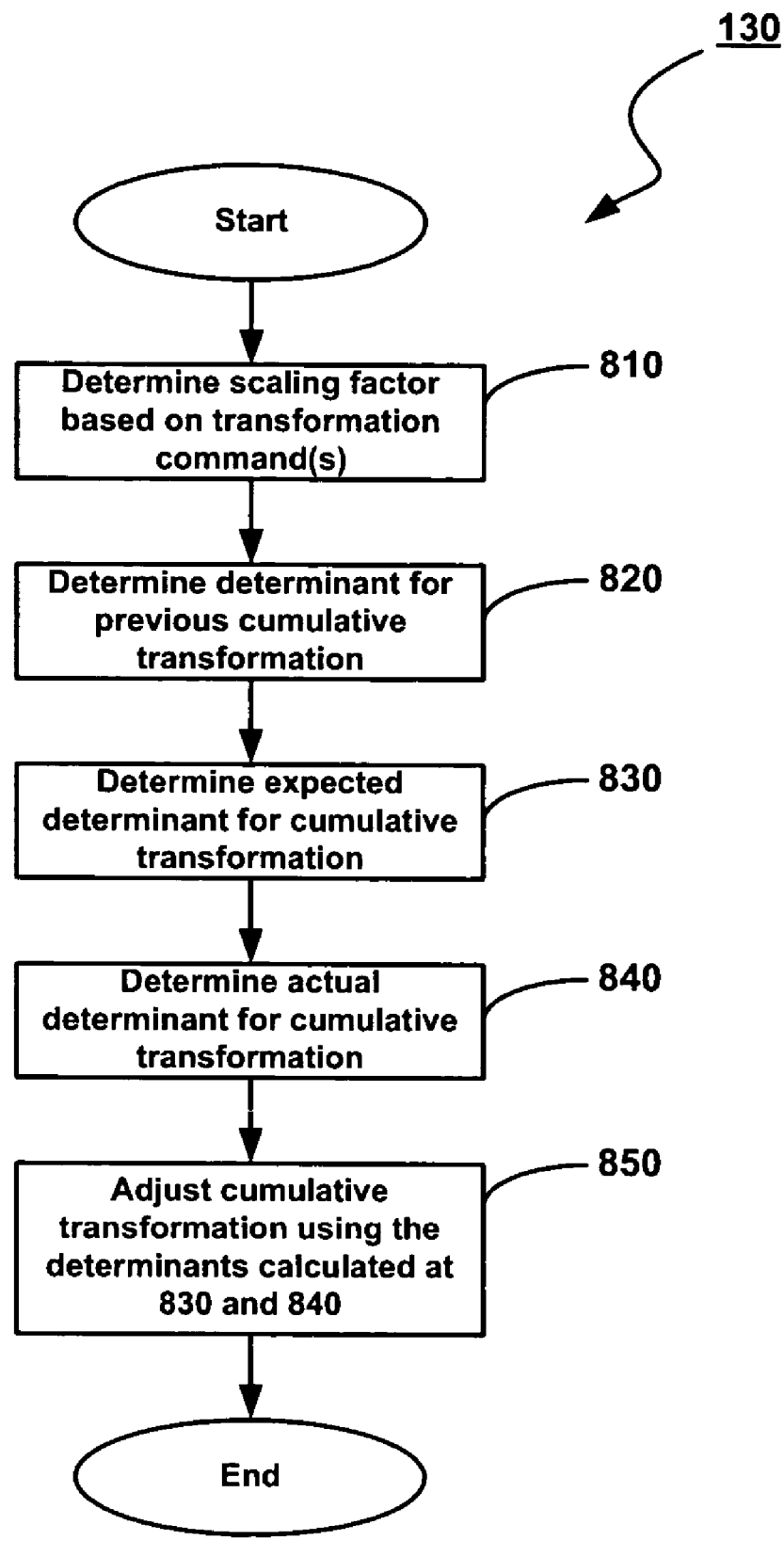
FIG. 11 shows a method of determining verification data and using it to adjust the cumulative transformation.

The determination of verification data and adjustment of the cumulative transformation matrix 700 using the verification data at 130 is better illustrated in FIG. 11. At 810, a scaling factor is determined based on the transformation command(s). received to provide the expected determinant of the additive transformation matrix 400. The determinant for the previously-determined cumulative transformation matrix 600 is determined at 820. At 830, the expected determinant for the cumulative transformation matrix 700 representing verification data is determined by multiplying the scaling factor by the determinant of the previously-determined cumulative transformation matrix 600. Then, at 840, the actual determinant of the cumulative transformation matrix 700 is determined. The cumulative transformation matrix 700 is then adjusted at 850 using a ratio of the expected determinant over the actual determinant.

Determinants have the following property:

$$\det(A \times C') = \det(A) \times \det(C') \qquad (Eq. 4)$$

Using this property and Equation 3, the difference between the expected cumulative transformation matrix and the actual cumulative transformation matrix 700 can be determined. Error is introduced to the cumulative transformation matrix 700 by the use of linear interpolation between values of a look-up table to determine the elements of the additive transformation matrix 400 applied to the previously-determined cumulative transformation matrix 600. Thus, by determining the expected determinant of the additive transformation matrix 400, and using this result to determine the expected determinant of the cumulative transformation matrix 700, the error introduced can be detected and subsequently adjusted for.

The scaling factor is determined at 810 as it is generally equal to the expected determinant of the additive transformation matrix 400. The scaling factor can be determined by how much the graphical object is to be scaled in accordance with the transformation commands received during the time segment since the cumulative transformation was last determined. If the graphical object is not to be scaled during this time segment, the scaling factor for the period is one.

In order to determine the expected determinant of the cumulative transformation matrix 700 at 830, Equation 4 is used. The scaling factor determined at 810 is substituted for the determinant of the additive transformation matrix 400, yielding an expected determinant for the cumulative transformation. The scaling factor-represents verification data for the additive transformation matrix 400.

During the adjustment of the cumulative transformation matrix 700 at 850, the elements of the first quadrant of the cumulative transformation matrix 700 are multiplied by the expected determinant of the cumulative transformation matrix 700 divided by the actual determinant of the cumulative transformation matrix 700 determined at 840. That is:

$$C_{quad1} \leftarrow C_{quad1} \times \frac{\text{expected}[\det(C)]}{\det(C)}$$

As previously discussed, the elements of the second, third and fourth quadrants do not have a direct bearing on the determination of the determinant. Further, the elements of the second quadrant include information with respect to the linear transformation of the graphical object that may be adversely affected by such an adjustment. Accordingly, the elements of the second, third and fourth quadrants of the cumulative transformation matrix 700 are not adjusted.

Once the cumulative transformation matrix 700 has been adjusted, it is applied to each of the indicia of the graphical object at 140 to determine the transformed indicia as follows:

$$I^T = C \times I \quad \text{(Eq. 5)}$$

where $I^T$ represents a transformed indicium and I represents an untransformed indicium represented by the indicium matrix 200. Using the cumulative transformation matrix 700 and the indicium represented by the indicium matrix 200, the transformed indicium is determined to be:

$$\begin{bmatrix} c_{11} & c_{12} & c_x \\ c_{21} & c_{22} & c_y \\ 0 & 0 & 1 \end{bmatrix} \begin{bmatrix} x \\ y \\ 1 \end{bmatrix} = \begin{bmatrix} c_{11} \times x + c_{12} \times y + c_x \\ c_{21} \times x + c_{22} \times y + c_y \\ 1 \end{bmatrix}$$

Once each of the indicia has been transformed, the plug-in application renders the graphical object on a presentation field via the output interface 44 at 150. Using the transformed indicia as a framework, along with knowledge of the graphical object, the portion of the presentation field that forms part of the graphical object can be discerned. For example, for a polygon, the indicia which represent vertices are transformed and then straight lines can be plotted between adjacent vertices to provide the sides of the polygon.

During the determination of whether to continue rendering the graphical object at 160, a number of conditions may be considered. The transformation commands can specify various conditions upon which the rendering of a graphical object can be altered or terminated. The conditions can pertain to time limitations, the receipt of user input, the receipt of additional information via the network interface 36, etc.

If it is determined that the object is to be rendered again, the method returns to 120, wherein the subsequent cumulative transformation is determined in accordance with the method described. If, instead, the graphical object is not to be rendered again, the method 100 ends.

As will be understood by a person skilled in the art, the error introduced for rotational transformations diverges unidirectionally with subsequent additive transformations with rotational components.

In order to better illustrate the embodiment of the Invention, the method 100 will now be described for an exemplary graphical object and transformation commands.

Figures 12, 13, 14:
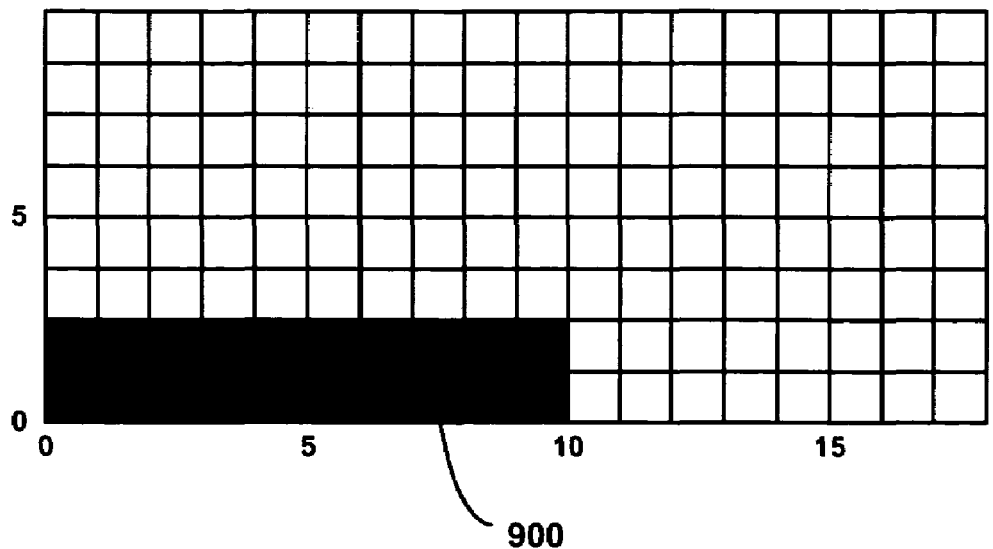
FIG. 12 shows an exemplary graphical object to be rendered.
FIG. 13 shows data representing the graphical object of FIG. 12.
FIG. 14 shows a set of transformation commands for transforming the graphical object of FIG. 12.

FIG. 12 shows an exemplary graphical object 900 to be rendered by the computing device 20, in black, presented on a labeled grid for illustration purposes. As shown, the graphical object 900 is a rectangle that has a height of two pixels and a width of ten pixels.

FIG. 13 shows the data representing the graphical object 900 that is communicated in the multimedia script received by the plug-in application at 110. The graphical object 900 is identified as having a shape 904 of a "rectangle". An anchor point 908 of the upper-left vertex is shown to be (0,0). The graphical object 900 is indicated to have a height 912 of two pixels and a width 916 of ten pixels.

FIG. 14 shows the transformation commands that are received with the graphical object 900 in the multimedia script received by the plug-in. A first transformation command 920 specifies that the graphical object 900 is to be initially positioned at the point (20,20). A second transformation command 924 specifies that the graphical object 900 is to be rotated 360 degrees over two seconds around (20,20), and that the rotation is to be repeated until user input is received. It is assumed that positive rotations are counter-clockwise.

Referring again to FIGS. 12 and 13, the graphical object 900 is identified as having the shape 904 of a "rectangle". Rectangles are assumed to have horizontal and vertical edges. As such, the vertices of the graphical object 900 described by the data in FIG. 13 are determined by the computing device 20 to be (0,0), (0,10), (2,10) and (2,0) in a clockwise direction around the edge of the graphical object 900. For polygons, it is assumed that the vertices are indicia. FIGS. 15a to 15d show the indicium matrixes 1000a, 1000b, 1000c and 1000d that correspond to these indicia.

The graphical object is then rendered for the first time. At 120, the cumulative transformation is determined as follows. At 310, the total period of time since the start of the animation is calculated. In this case, as the animation is just commencing, the time interval is zero. At 320, the time segment since the last rendering of the graphical object is determined. As the graphical object was not previously rendered, the time segment is zero.

Then, at 330, the additive transformation is determined for the time segment determined at 320. The first transformation command 920 is applicable as it pertains to the initial positioning of the graphical object 900. As no time has passed, however, no rotation of the graphical object 900 occurs prior to the first rendering. Thus, the additive transformation matrix 400 is as follows:

$$\begin{bmatrix} 1 & 0 & 20 \\ 0 & 1 & 20 \\ 0 & 0 & 1 \end{bmatrix}$$

At 340, as there is no previously-determined cumulative transformation matrix, the additive transformation matrix noted immediately above is simply established as the cumulative transformation matrix.

At 130, the verification data is determined and used to adjust the cumulative transformation matrix 700 as follows. At 810, the scaling factor based on the transformation commands is determined. As no scaling is specified by the transformation commands for the time segment determined at 320, the scaling factor is determined to be 1.0. At 820, the determinant for the previously-determined cumulative transformation is determined. As there is no previously-determined cumulative transformation, the determinant is determined to be 1.0 as only a linear transformation has occurred. At 830, the expected determinant for the cumulative transformation matrix 700 representing verification data is determined. This is equal to the scaling factor determined at 810 (i.e., 1.0) multiplied by the determinant of the previously-determined cumulative transformation matrix 600 determined at 820 (i.e., 1.0), or 1.0. At 840, the actual determinant is determined for the cumulative transformation matrix 700. As the cumulative transformation is the same as the additive transformation matrix 400 noted above, the determinant is determined to be 1.0. At 850, the elements of the first quadrant of the cumulative transformation matrix 700 is multiplied by 1.0 divided by 1.0, thereby leaving the cumulative transformation matrix 700 the same as before the adjustment.

At 140, the cumulative transformation matrix 700 is applied to the graphical object. During 140, the cumulative transformation is applied to each of the indicia 1000a to 1000d in accordance with Equation 5. This yields the following transformed indicia:

$$\begin{bmatrix} 20 \\ 20 \\ 1 \end{bmatrix}, \begin{bmatrix} 20 \\ 22 \\ 1 \end{bmatrix}, \begin{bmatrix} 30 \\ 22 \\ 1 \end{bmatrix}, \begin{bmatrix} 30 \\ 20 \\ 1 \end{bmatrix}$$

At 150, the graphical object is then rendered via the output interface 44. Here, as the graphical object 900 is a polygon, straight lines connecting adjacent transformed indicia are determined and any pixels residing between the lines are shaded to denote that they form part of the graphical object 900.

Figures 15A, 15B, 15C, 15D, 16:
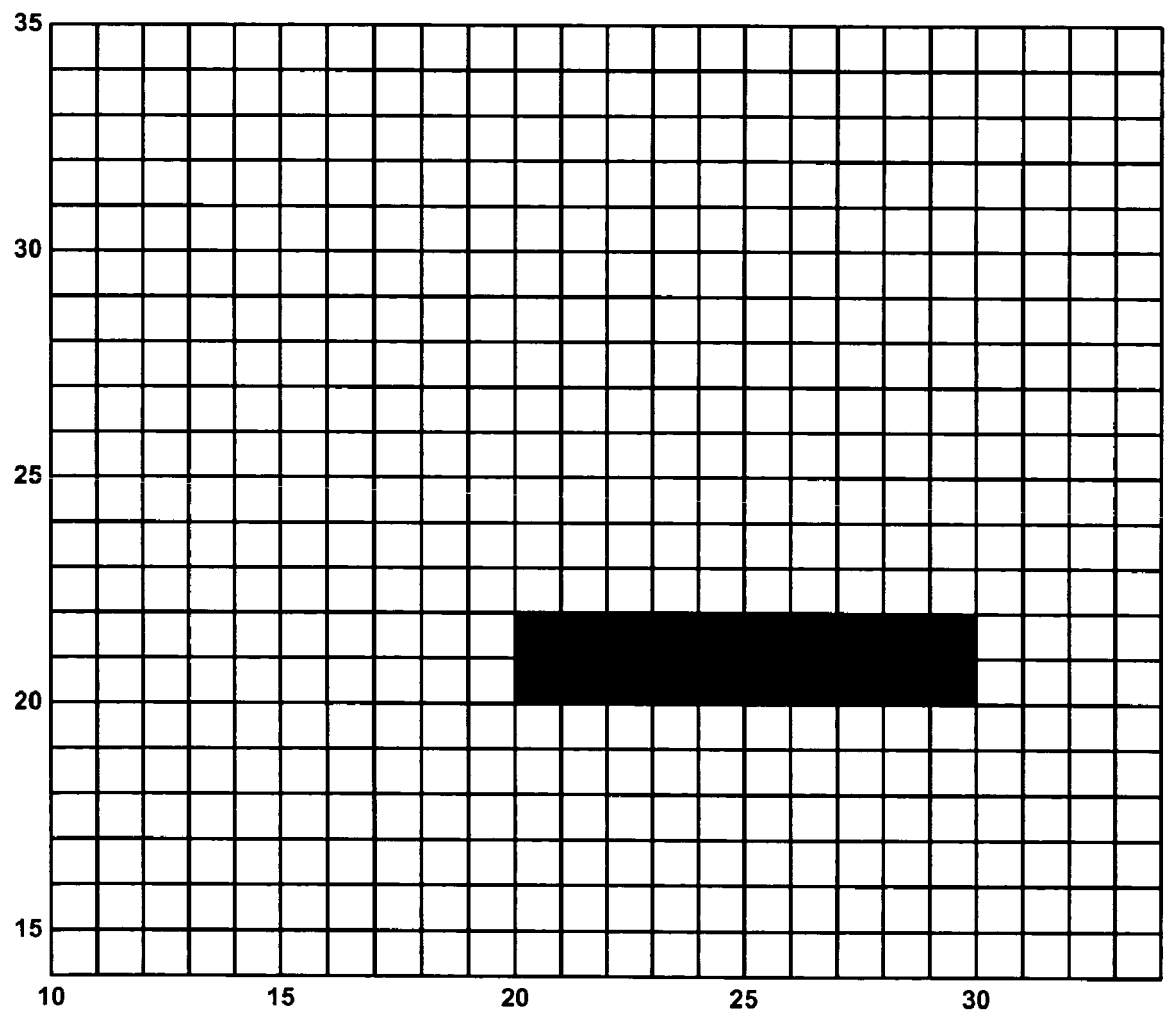

FIG. 16 shows the resulting rendered graphical object 900 portrayed on a grid for illustration purposes.

At 160, it is determined, in accordance with the transformation commands, that, since no user input has been received, rendering continues. As a result, the method returns to 120.

At 120, the cumulative transformation is determined as follows. At 310, the total period of time since the start of the animation is calculated. For purposes of illustration, it will be assumed that 0.14 seconds have passed since the beginning of the animation: At 320, the time segment since the last rendering of the graphical object 900 is determined. This is equal, in this case, to the time segment determined at 310; that is, the time period from 0 to 0.142 seconds.

Then, at 330, the additive transformation matrix 400 is determined for the time segment determined at 320. The time segment commences at time zero and ends 0.14 seconds later. The second transformation command 924 applies for this period. In accordance with the second transformation command 924, the graphical object is to be rotated 360 degrees about the point (20,20) over two seconds. Thus, in 0.142 seconds, the graphical object is to be rotated approximately 25.56 (=0.142÷2×360) degrees. As the graphical object is to be rotated about the point (20,20) and not the point (0,0), the center of rotation is first be transformed to (0,0) before rotation, then the rotation can be applied and, finally, the center of rotation is transformed back to the point (20,20).

As a result, the additive transformation matrix 400 in this case is a composite of three sub-transformation matrices. The first of the sub-transformation matrices for transforming the center of rotation from (20,20) to the point (0,0) is:

$$\begin{bmatrix} 1 & 0 & -20 \\ 0 & 1 & -20 \\ 0 & 0 & 1 \end{bmatrix}$$

The second of the sub-transformation matrices accounts for the rotation of the graphical object about the point (0,0) In accordance with Equation 1, the second of the sub-transformation matrices is determined to be as follows:

$$\begin{bmatrix} \cos(25.56°) & -\sin(25.56°) & 0 \\ \sin(25.56°) & \cos(25.56°) & 0 \\ 0 & 0 & 1 \end{bmatrix}$$

The third of the sub-transformation matrices transforms the center of rotation from (0,0) back to (20,20):

$$\begin{bmatrix} 1 & 0 & 20 \\ 0 & 1 & 20 \\ 0 & 0 & 1 \end{bmatrix}$$

As can be seen below, the additive transformation matrix 400 is a composite of the three sub-transformation matrices, with the direction of application being from right to left in matrix multiplication:

$$A = \begin{bmatrix} 1 & 0 & 20 \\ 0 & 1 & 20 \\ 0 & 0 & 1 \end{bmatrix} \begin{bmatrix} \cos(25.56°) & -\sin(25.56°) & 0 \\ \sin(25.56°) & \cos(25.56°) & 0 \\ 0 & 0 & 1 \end{bmatrix} \begin{bmatrix} 1 & 0 & -20 \\ 0 & 1 & -20 \\ 0 & 0 & 1 \end{bmatrix}$$

$$= \begin{bmatrix} \cos(25.56°) & -\sin(25.56°) & 20(\sin(25.56°) - \cos(25.56°) + 1) \\ \sin(25.56°) & \cos(25.56°) & -20(\sin(25.56°) + \cos(25.56°) - 1) \\ 0 & 0 & 1 \end{bmatrix}$$

As the trigonometric values required are not integral, they are determined using linear interpolation between adjacent integral values of the look-up table 500. The upper-left element is determined as follows:

$$\cos(25.56°) = (25 + 1 - 25.56) \times \cos(25°) + (25.56 - 25) \times \cos(26°)$$

$$= 0.44 \times \sin(65°) + 0.56 \times \sin(64°)$$

$$\approx 0.44 \times 0.90631 + 0.56 \times 0.89879$$

$$= 0.90210$$

The upper-central element is determined as follows:

$$\sin(25.56°) = (25 + 1 - 25.56) \times \sin(25°) + (25.56 - 25) \times \cos(26°) =$$

$$0.44 \times \sin(25°) + 0.56 \times \sin(26°) \approx$$

$$0.44 \times 0.42262 + 0.56 \times 0.43837 = 0.43144$$

The remainder of the elements can be determined using the above-determined values.

By deduction, the mid-left and mid-central elements are 0.43144 and 0.90210 respectively. Accordingly, the additive transformation matrix 400 is:

$$A = \begin{bmatrix} 0.90210 & -0.43144 & 10.58680 \\ 0.43144 & 0.90210 & -6.67080 \\ 0 & 0 & 1 \end{bmatrix}$$

At 340, the additive transformation matrix 400 is applied to the previously-determined cumulative transformation matrix 600 (i.e., the cumulative transformation matrix determined the last time at 120) to provide the cumulative transformation matrix 700 as follows:

$$C = \begin{bmatrix} 0.90210 & -0.43144 & 10.58680 \\ 0.43144 & 0.90210 & -6.67080 \\ 0 & 0 & 1 \end{bmatrix}$$

$$\begin{bmatrix} 1 & 0 & 20 \\ 0 & 1 & 20 \\ 0 & 0 & 1 \end{bmatrix} = \begin{bmatrix} 0.90210 & -0.43144 & 20 \\ 0.43144 & 0.90210 & 20 \\ 0 & 0 & 1 \end{bmatrix}$$

At 130, the verification data is determined and used to adjust the cumulative transformation as follows. At 810, the scaling factor based on the transformation commands is determined. As no scaling is specified by the transformation commands for the period of time determined at 320, the scaling factor is determined to be 1.0. At 820, the determinant for the previously-determined cumulative transformation is determined. Based on the previously-determined cumulative transformation noted above, the determinant is determined to be 1.0. At 830, the expected determinant for the cumulative transformation matrix 700 representing verification data is determined. This is equal to the scaling factor determined at 810 (i.e., 1.0) multiplied by the determinant of the previously-determined cumulative transformation matrix 600 determined at 820 (i.e., 1.0), or 1.0. At 840, the actual determinant for the cumulative transformation matrix 700 is determined. In this case, the determinant of the cumulative transformation matrix 700 noted above is approximately 0.99993. At 850, the elements of the first quadrant of the cumulative transformation are multiplied by 1.0 divided by 0.99993, thereby providing the following adjusted cumulative transformation:

$$C = \begin{bmatrix} 0.90216 & -0.43147 & 20 \\ 0.43147 & 0.90216 & 20 \\ 0 & 0 & 1 \end{bmatrix}$$

At 140, the cumulative transformation matrix 700 is applied to the graphical object 900. During 140, the cumulative transformation matrix 700 is applied to each of the indicia 1000a to 1000d. This yields the following transformed indicia:

$$\begin{bmatrix} 20 \\ 20 \\ 1 \end{bmatrix}, \begin{bmatrix} 19.13706 \\ 21.80432 \\ 1 \end{bmatrix}, \begin{bmatrix} 28.15866 \\ 26.11902 \\ 1 \end{bmatrix}, \begin{bmatrix} 29.02160 \\ 24.31270 \\ 1 \end{bmatrix}$$

At 150, the graphical object 900 is then rendered via the output interface. Here, as the graphical object 900 is a polygon, straight lines connecting adjacent transformed indicia are determined and any pixels residing between the lines are shaded to denote that they form part of the graphical object.

Figure 17:
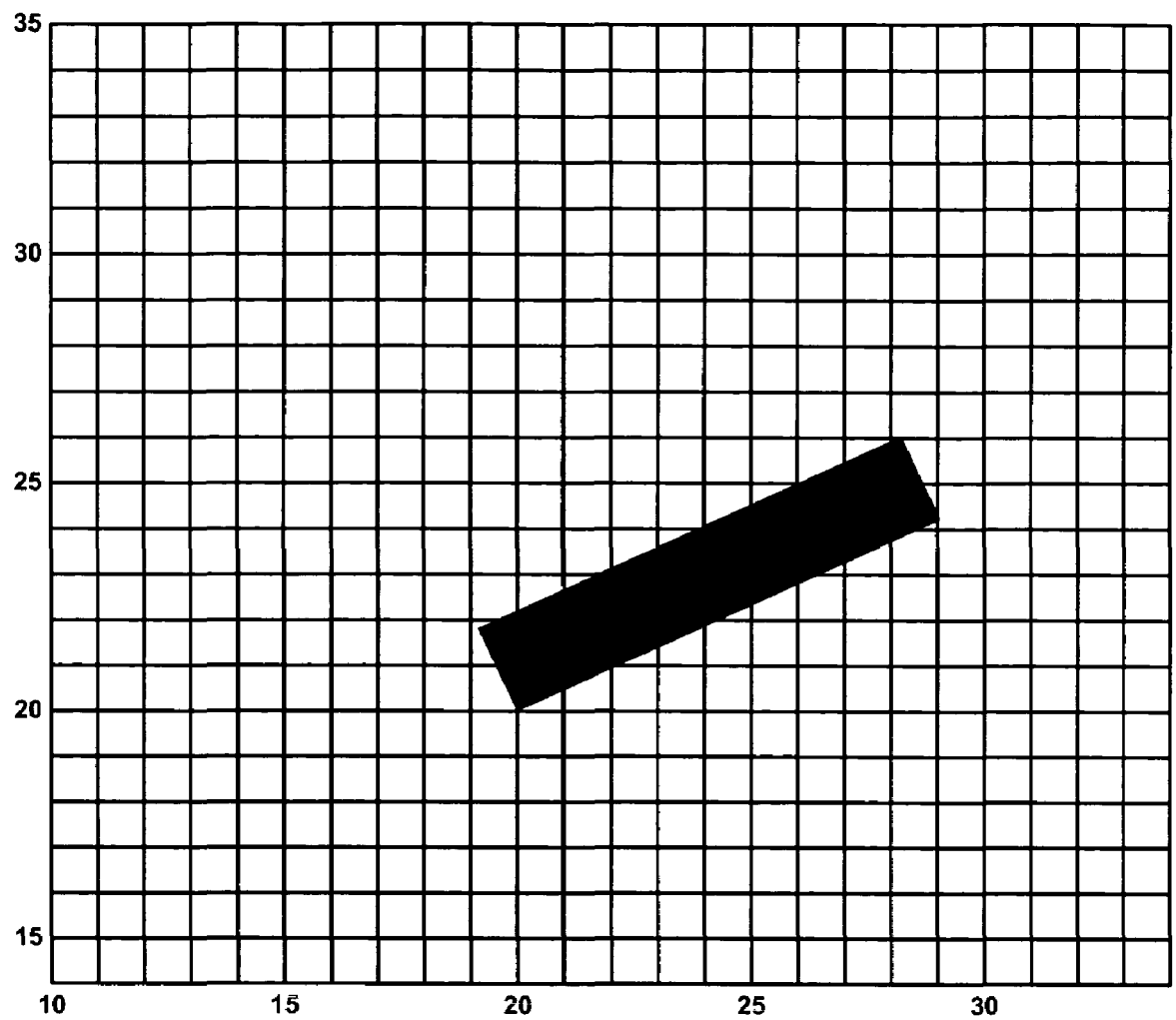
FIG. 17 shows the graphical object of FIG. 12 rendered after a subsequent transformation.

FIG. 17 shows the resulting rendered graphical object portrayed on a grid for illustration purposes.

At 160, it is determined, in accordance with the transformation commands, that, since no user input has been received, rendering continues. As a result, the method returns to 120, continuing in this manner until user input is received.

Various embodiments of the invention have been found to provide advantages where the sample frequency of the look-up table is low. In particular, it has been found that advantages are apparent with sample frequencies lower than 10 per degree (i.e., a difference of greater than 0.1 degrees between values in the table). Where the sample frequencies are less or equal to 1 per degree (i.e., a difference of 0.1 degrees or greater between values in the table), it has been found that various embodiments of the invention provide significant advantages.

While the described embodiment of the invention has been explained with specificity to polygons, other geometric shapes can be used as graphical objects. For example, circles and ellipses can be employed. In this case, the indicia could be the center of the circle and the four points along its circumference corresponding to perpendicular lines through the center. Further, other types of graphical objects will occur to those of skill in the art. For example, the graphical object can be an image compressed using jpeg compression or a bitmap.

Various other transformation commands can be employed, such as shears, scalings, etc. Further, a transformation command can include two or more such transformations to be performed simultaneously. For example, a transformation command can specify that a graphical object is to be rotated and scaled simultaneously.

While the described embodiment of the invention has been explained with respect to affine transformations (i.e., rotations, scales, shears, skews and translations), one of skill in the art will appreciate that various embodiments of the invention can also be employed with transformations that are not affine. For example, where a swirl transformation is performed (i.e., where rotation is increased based on proximity to the center of rotation), more than two indicia can be used to define a straight line prior to transformation, and curve fitting can be performed to render the transformed previously-straight line.

The transformations can be dependent on time, user interaction, information received from the network interface, local processing resources (e.g., for the duration of a calculation), etc.

During construction of the look-up table, trigonometric values can be adjusted to provide a mean error of zero.

One skilled in the art will understand that there are other types of transformations, such as color, transparency, etc., for which various embodiments of the invention provides advantages.

The adjustment to the cumulative transformation matrix can be applied selectively based on the detection of an event, such as the application of an additive matrix representing a rotation. In addition, the additive transformation matrix can be adjusted prior to its application to the cumulative transformation matrix.

The adjusting of the transformations can be performed infrequently. For example, verification data can track the expected determinant of the cumulative transformation matrix, but may only be applied on demand, at set time or iteration intervals, etc. Alternatively, the error may be corrected only when it achieves a desired magnitude. Such approaches can provide, in some cases, reduced processor load.

The cumulative transformation matrix can be initiated using the identity matrix instead of being set the same as the initial additive transformation matrix.

The transformation matrices can be broken down into components. For example, the rotation component (i.e. the first quadrant) can be maintained as a 2 by 2 matrix and the translation component (i.e., the second quadrant, can be maintained as a separate 2 by 1 matrix. Other methods of storing and manipulating the transformations will occur to those skilled in the art.

Various embodiments of the invention can be readily applied to the rendering of three-dimensional objects.

While the output interface has been described with specificity to displays, other output interfaces known to those skilled in the art can be used, such as printers.

The above-described embodiment of the invention is intended to be an example of the invention and alterations and modifications may be effected thereto, by those of skill in the art, without departing from the scope of the invention which is defined solely by the claims appended hereto.

What is claimed is:

1. A method of rendering a graphical object with a computing device having an output interface, comprising:
   determining an additive transformation to be applied to a graphical object by linearly interpolating between a set of trigonometric values;
   applying said additive transformation to a previously-determined cumulative transformation to obtain a cumulative transformation;
   determining verification data corresponding to said cumulative transformation;
   adjusting said cumulative transformation using said verification data; and
   rendering said graphical object transformed with said cumulative transformation via said output interface.

2. The method of rendering a graphical object of claim 1, wherein the difference between consecutive trigonometric values is greater than 0.1 degrees.

3. The method of rendering a graphical object of claim 2, wherein the difference between consecutive trigonometric values is greater than or equal to one degree.

4. The method of rendering a graphical object of claim 3, wherein said additive transformation and said cumulative transformation are represented by matrices.

5. The method of rendering a graphical object of claim 4, wherein said determining said verification data comprises determining a determinant.

6. The method of rendering a graphical object of claim 5, wherein said determining said verification data comprises:
   determining the expected determinant of said additive transformation;
   determining the determinant of said previously-determined cumulative transformation; and
   multiplying the determinant of said previously-determined cumulative transformation by the expected determinant of said additive transformation.

7. The method of rendering a graphical object of claim 6, wherein said adjusting of said transformation comprises adjusting at least one entry of said transformation using said verification data.

8. The method of rendering a graphical object of claim 7, wherein said transformation is applied to an indicium of said graphical object.

9. The method of rendering a graphical object of claim 1, wherein said output interface is a display.

10. The method of rendering a graphical object of claim 1, wherein said computing device has limited memory means.

11. The method of rendering a graphical object of claim 1, wherein said computing device has limited processing means.

12. The method of rendering a graphical object of claim 1, wherein said computing device is a handheld electronic device.

13. A computing device for rendering a graphical object, comprising:
   output means;
   memory means for storing a graphical object, a previously-determined cumulative transformation to be applied to said graphical object, and program code for rendering said graphical object via said output means; and
   processing means for executing said program code to determine an additive transformation to be applied to said previously-determined cumulative transformation to generate a cumulative transformation by linearly interpolating between a set of trigonometric values, for determining verification data corresponding to said cumulative transformation, for adjusting said cumulative transformation using said verification data, to apply said cumulative transformation to said graphical object, and to render said graphical object via said output means.

14. The computing device of claim 13, wherein the difference between consecutive trigonometric values is greater than 0.1 degrees.

15. The computing device of claim 14, wherein the difference between consecutive trigonometric values is greater than or equal to one degree.

16. The computing device of claim 13, wherein said additive transformations and said cumulative transformation are represented by matrices.

17. The computing device of claim 16, wherein determining said verification data comprises determining a determinant.

18. The computing device of claim 17, wherein said determining said verification data comprises:
   determining the expected determinant of said additive transformation;
   determining the previously-determined determinant of said cumulative transformation; and
   multiplying the determinant of said previously-determined cumulative transformation by the expected determinant of said additive transformation.

19. The computing device of claim 18, wherein said adjusting of said cumulative transformation comprises adjusting at least one entry of said transformation using said verification data.

20. The computing device of claim 19, wherein said cumulative transformation is applied to an indicium of said graphical object.

21. The computing device of claim 13, wherein said output means is a printer.

22. The computing device of claim 13, wherein said memory means are limited.

23. The computing device of claim 13, wherein said processing means are limited.

24. The computing device of claim 13, wherein said computing device is a handheld electronic device.

25. A computer readable medium encoded with a computer application for execution on a computing device, said computing device having an output interface, comprising:
   program code for determining an additive transformation to be applied to a graphical object by linearly interpolating between a set of trigonometric values;
   program code for applying said additive transformation to a previously-determined cumulative transformation to obtain a cumulative transformation;
   program code for determining verification data corresponding to said cumulative transformation;
   program code for adjusting said cumulative transformation using said verification data; and
   program code for rendering said graphical object transformed with said cumulative transformation via said output interface.

26. The computer application of claim 25, wherein the difference between consecutive trigonometric values is greater than 0.1 degrees.

27. The computer application of claim 26, wherein the difference between consecutive trigonometric values is greater than or equal to one degree.

28. The computer application of claim 25, wherein said transformation is represented by a matrix.

29. The computer application of claim 28, wherein said verification data is comprised of a determinant.

30. The computer application of claim 29, wherein said program code for adjusting of said cumulative transformation comprises program code for adjusting at least one entry of said cumulative transformation using said verification data.

31. The computer application of claim 25, wherein said output interface is a display.

32. The computer application of claim 25, wherein said computing device has limited memory means.

33. The computer application of claim 25, wherein said computing device has limited processing means.

34. The computer application of claim 25, wherein said computing device is a handheld electronic device.

* * * * *